US012350943B2

(12) United States Patent
Smith et al.

(10) Patent No.: US 12,350,943 B2
(45) Date of Patent: Jul. 8, 2025

(54) PRINT FLUID RECIRCULATION

(71) Applicant: Hewlett-Packard Development Company, L.P., Spring, TX (US)

(72) Inventors: David L. Smith, Corvallis, OR (US); Eric Beyer, Corvallis, OR (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 174 days.

(21) Appl. No.: 18/248,826

(22) PCT Filed: Oct. 13, 2020

(86) PCT No.: PCT/US2020/055358
§ 371 (c)(1),
(2) Date: Apr. 12, 2023

(87) PCT Pub. No.: WO2022/081136
PCT Pub. Date: Apr. 21, 2022

(65) Prior Publication Data

US 2023/0415488 A1 Dec. 28, 2023

(51) Int. Cl.
*B41J 2/18* (2006.01)
*B41J 2/175* (2006.01)

(52) U.S. Cl.
CPC ............. *B41J 2/18* (2013.01); *B41J 2/17596* (2013.01)

(58) Field of Classification Search
CPC ......... B41J 2/17596; B41J 2/1707; B41J 2/18
See application file for complete search history.

(56) References Cited

U.S. PATENT DOCUMENTS

| | | | | |
|---|---|---|---|---|
| 7,364,285 | B2 | 4/2008 | Murad et al. | |
| 8,348,406 | B2 | 1/2013 | Park | |
| 9,649,848 | B1 | 5/2017 | Begeal et al. | |
| 9,694,582 | B1 | 7/2017 | Stephens et al. | |
| 9,724,926 | B2 | 8/2017 | Keefe et al. | |
| 10,899,136 | B2 * | 1/2021 | Butinya ............... | B41J 2/16502 |
| 2013/0293641 | A1 | 11/2013 | Essen et al. | |
| 2014/0043404 | A1 | 2/2014 | Hoisington et al. | |
| 2017/0282544 | A1 | 10/2017 | Stephens et al. | |
| 2019/0061365 | A1 | 2/2019 | Stephens | |
| 2019/0152231 | A1 | 5/2019 | Profaca et al. | |
| 2019/0263130 | A1 | 8/2019 | Butinya et al. | |
| 2019/0275804 | A1 | 9/2019 | Naoki | |
| 2020/0276823 | A1 | 9/2020 | Thomas et al. | |

FOREIGN PATENT DOCUMENTS

| | | | |
|---|---|---|---|
| CN | 1960879 | B | 12/2010 |
| CN | 107264031 | A | 10/2017 |
| CN | 109421382 | A | 3/2019 |
| CN | 109982855 | A | 7/2019 |
| WO | 2020/025305 | A1 | 2/2020 |

* cited by examiner

*Primary Examiner* — An H Do
(74) *Attorney, Agent, or Firm* — Jordan IP Law, LLC

(57) ABSTRACT

In one example of the disclosure, a system for print fluid recirculation includes a supply manifold, a recirculation manifold, a printbar, and a recirculation pathway. The printbar includes a plurality of printheads that are in fluid communication with the supply manifold, and the recirculation manifold. The recirculation pathway is in fluid connection with the supply manifold and the recirculation manifold, and is to enable recirculation of print fluid at a controlled flow through the plurality of printheads.

14 Claims, 15 Drawing Sheets

Print Fluid Recirculation System
100

PRINT FLUID RECIRCULATION

BACKGROUND

A printer may apply print fluids to a paper or another substrate to produce an image. One example of printer is an inkjet print system (e.g., thermal print inkjet or piezo print inkjet) wherein sets of printheads are utilized for applying print fluids directly upon a substrate. In other examples, inkjet printheads may be utilized to apply print fluids upon a blanket or other intermediate transfer member, wherein the intermediate transfer member is to be brought into contact with the substrate and thereby convey the print fluids to the substrate.

DRAWINGS

Figure 12A:
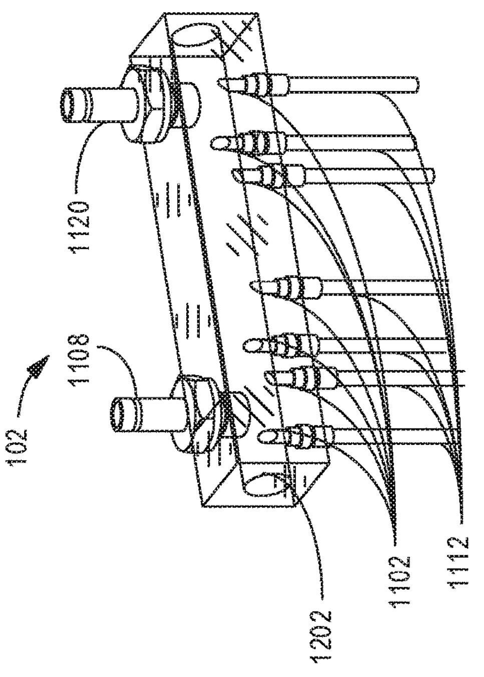
Figure 12B:
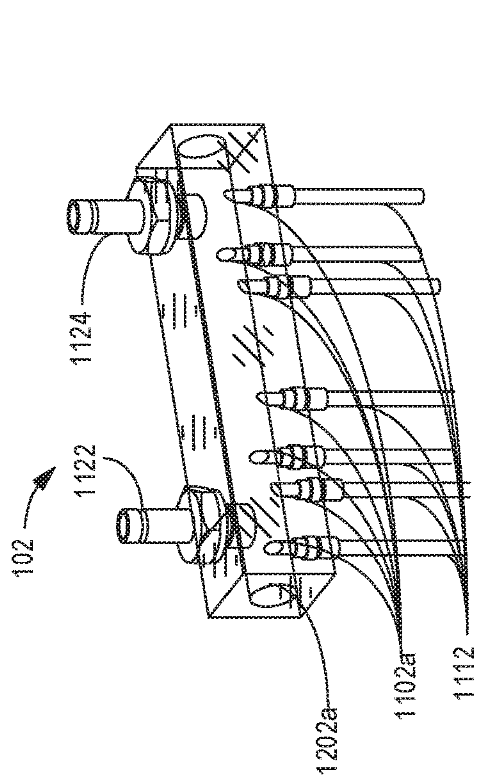
Figure 12C:
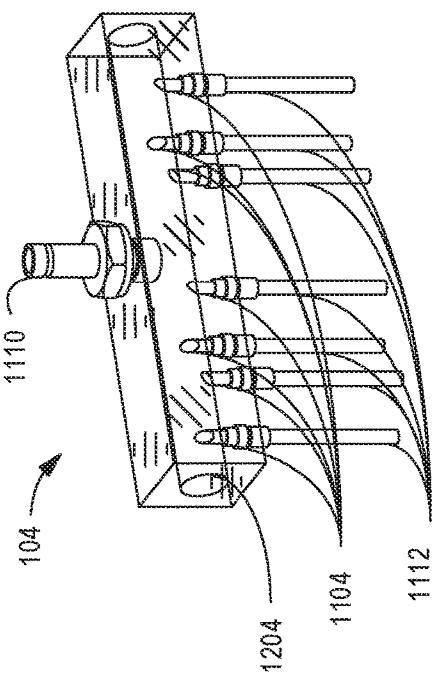
Figure 12D:
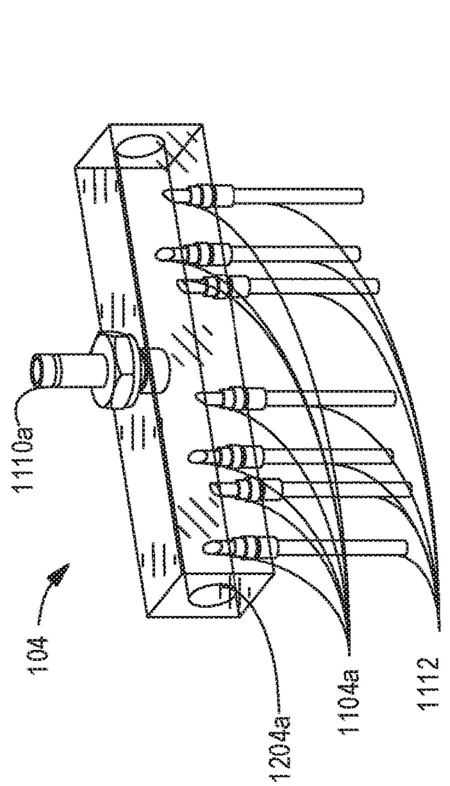

FIGS. 12A and 12B provide perspective views of supply manifolds in an example system for print fluid recirculation, FIGS. 12C and 12D provide perspective views of recirculation manifolds in an example system for print fluid recirculation.

Figure 13:
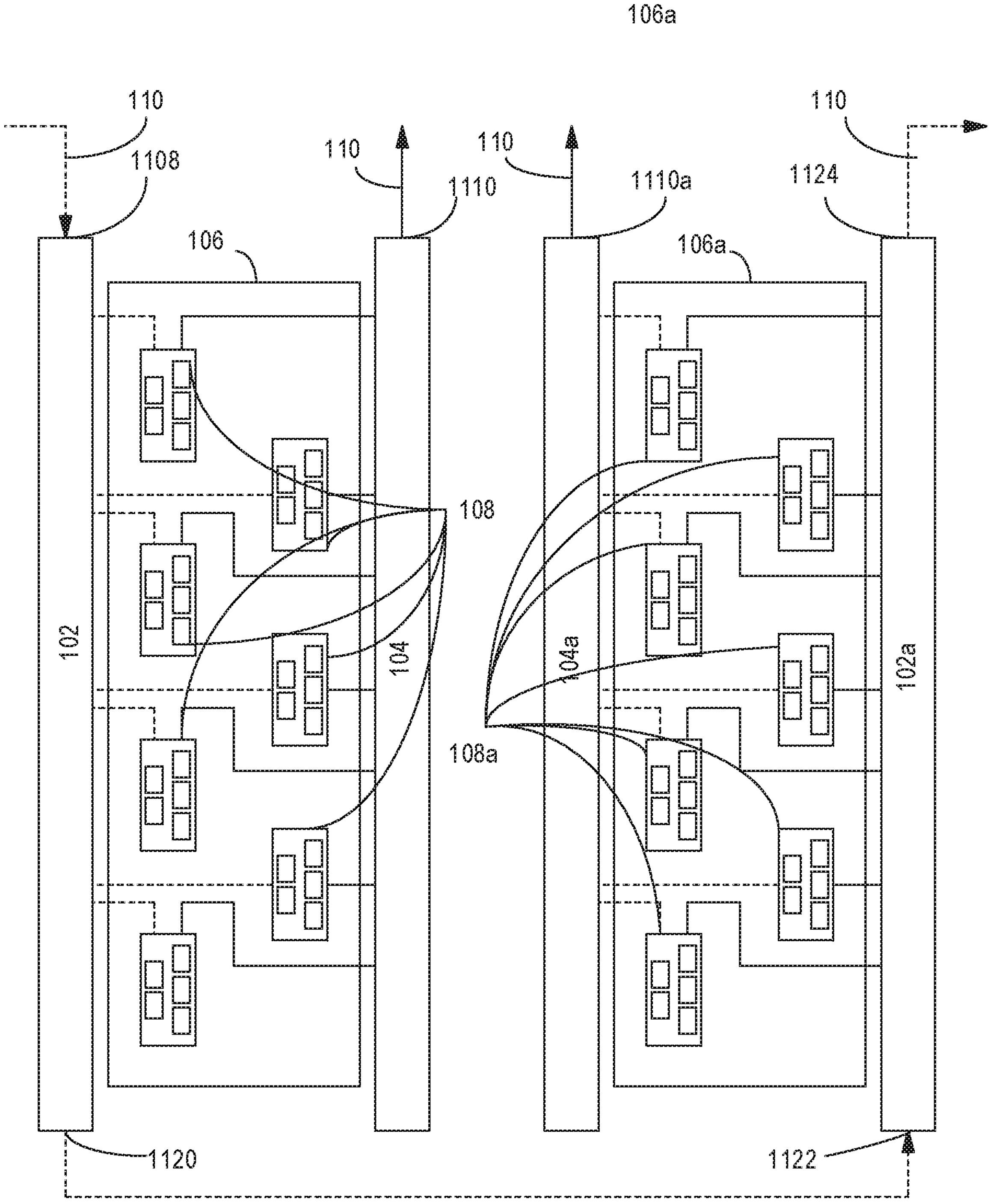

FIG. 13 is a bottom-up view of printbars, supply manifolds, and recirculation manifolds in fluid connection with one another in another example system for print fluid recirculation.

Figure 14:
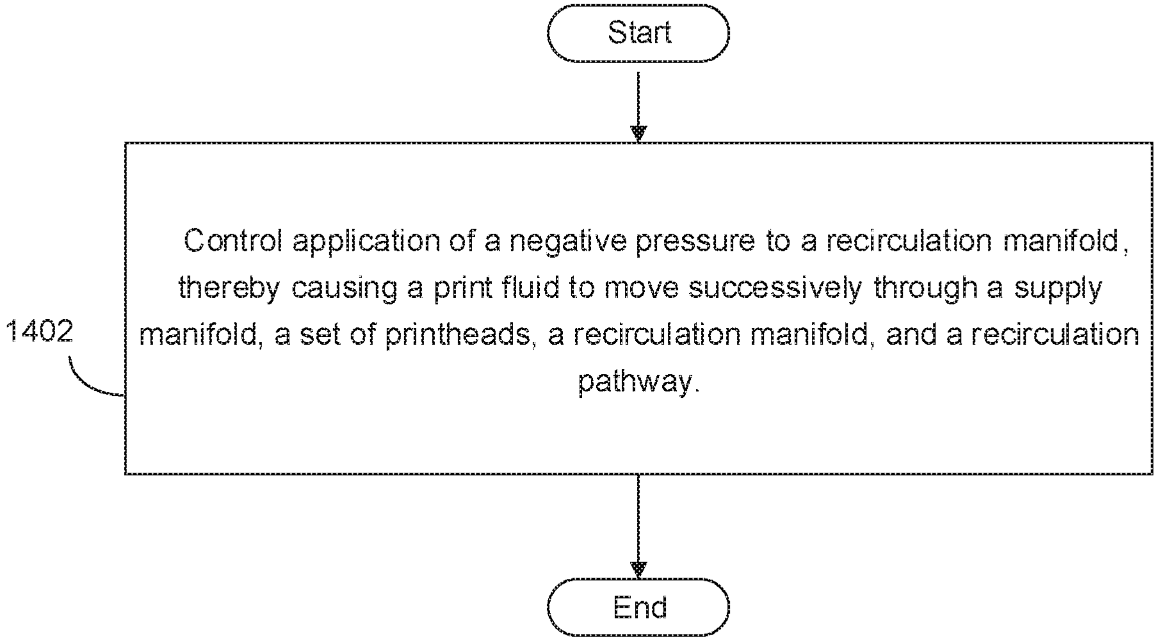

FIG. 14 is a flow diagram depicting implementation of an example of a method for print fluid recirculation.

Figure 15:
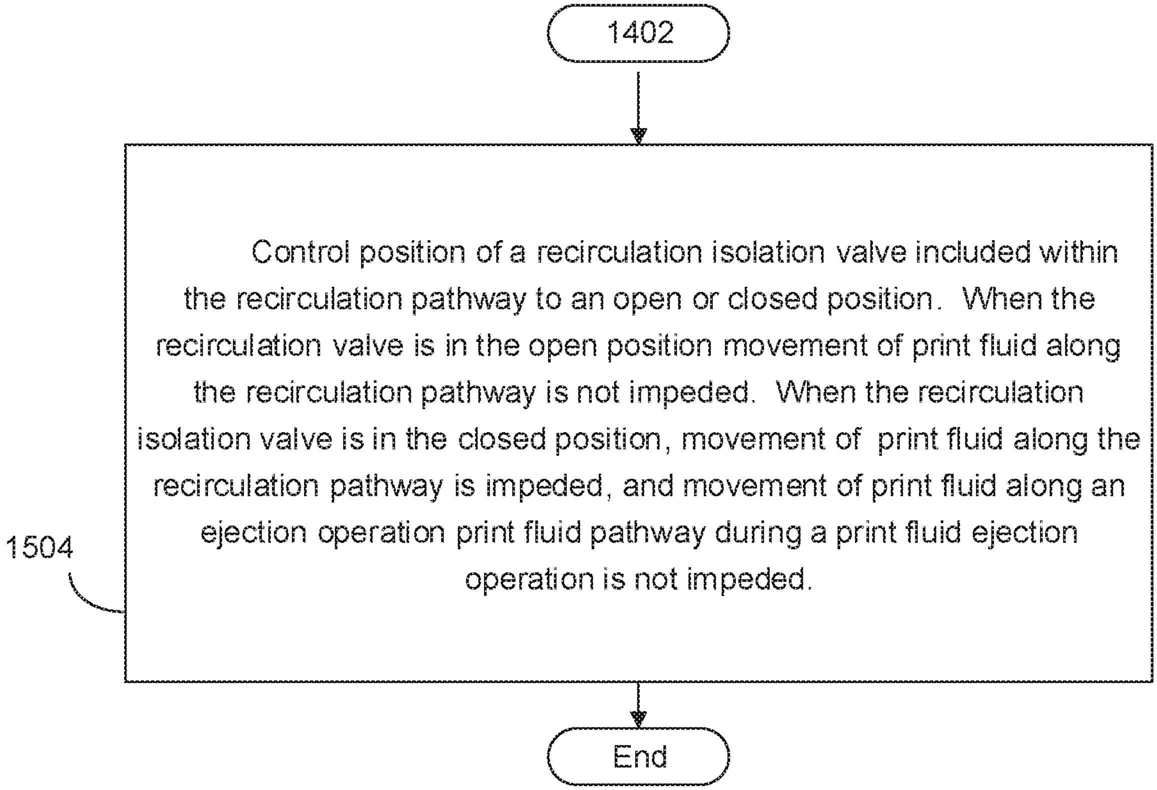

FIG. 15 is a flow diagram depicting implementation of another example of a method for print fluid recirculation.

DETAILED DESCRIPTION

With many conventional inkjet printing systems, print fluid is pushed through printheads during certain printing operations, but the print fluid does not circulate within or between the printheads during non-printing operations. Lack of print fluid circulation for extended operations can present significant challenges. Printhead nozzles are prone to gulp air between print jobs, causing residual print fluid in the nozzles to dry out. The dried print fluid can cause significant print quality issues, and can damage the printheads such that the printheads will need to be replaced. Replacing printheads involves not only a materials cost, but also productivity costs during the printer downtime.

Some inkjet printing systems schedule and perform printhead spit routines as a maintenance operation to discourage drying of ink in the nozzles. Typically, during a spit routine the printheads eject print fluid into a sponge and/or spittoon between print jobs. However, for certain printers and print jobs the spitting routines come with significant costs, Such costs may include expense of the print fluid and consumables (e.g., sponges) consumed, and printer downtime associated with user replacement of spit routine consumables or emptying of a spittoon. Further, in some situations the spitting operation may result in print fluid missing the consumable sponge or the spittoon, leading to other print quality or printer damage issues.

To address these issues, various examples described in more detail below provide a new system and a method that enable automated print fluid recirculation at a printer. In an example, a print fluid recirculation system includes a supply manifold, a recirculation manifold, and a recirculation pathway. The printbar includes a set of printheads that are in fluid communication with one another, with the supply manifold, and with the recirculation manifold. The recirculation pathway is in fluid connection with supply manifold and the recirculation manifold, and is to enable recirculation of print fluid at a controlled and consistent flow through the set of printheads.

In examples, the print fluid recirculation system may include a first vacuum source and a vacuum regulator. The first vacuum source is in fluid communication with the recirculation manifold and is to cause application of a negative pressure to the recirculation manifold. The vacuum regulator is in fluid communication with the recirculation manifold, the first vacuum source, and a second vacuum source. The vacuum regulator together with the second vacuum source are for adjusting the negative pressure applied to the recirculation manifold by the first vacuum source. In examples, the print fluid recirculation system may include a control engine to control the first vacuum source and the vacuum regulator to provide a consistent target vacuum pressure as print fluid is moved through the set of printheads.

In examples, the print fluid recirculation system may include a reservoir. In examples the first vacuum source may be a recirculation pump and is to pump print fluid that has passed through the recirculation manifold and the vacuum regulator into the reservoir. In examples, the recirculation pathway may include a supply pump in fluid connection with the reservoir. In these examples, the supply pump is to pump print fluid from the reservoir to the supply manifold.

In examples, the print fluid recirculation system may include an electronic pressure regulator component in fluid communication with, and situated between, the vacuum regulator and the second vacuum source. The electronic pressure regulator component is to provide a pilot pressure to the vacuum regulator.

In examples, the recirculation pathway may include a recirculation isolation valve in fluid communication with the recirculation manifold and a reservoir. The recirculation isolation valve is to enable print fluid to move from the recirculation manifold to the reservoir when the recirculation isolation valve is open. The recirculation isolation valve is to not enable print fluid to move from the recirculation manifold to the reservoir when the recirculation isolation valve is closed. In examples, when the recirculation isolation valve is closed movement of the print fluid along an ejection operation print fluid return pathway during a print fluid ejection operation is not impeded.

In examples, the print fluid recirculation system may provide for print fluid recirculation among multiple printbars, each printbar having its own set of printheads. Examples of the print fluid recirculation system may include multiple supply manifolds and multiple recirculation manifolds.

Users of inkjet printing systems will appreciate the avoidance of print quality issues and equipment damage that often result from drying of print fluid in printheads between print fluid ejection operations. In implementations, the disclosed system and method should greatly reduce the number of spitting operations performed. Utilization of the disclosed print fluid recirculation system and method should result in a significant reduction of replacement of printheads and reduction of printer downtime. Customer satisfaction with inkjet printers that utilize the disclosed system and method will be enhanced, such that installations and utilization of such inkjet printers should increase.

Figure 1:
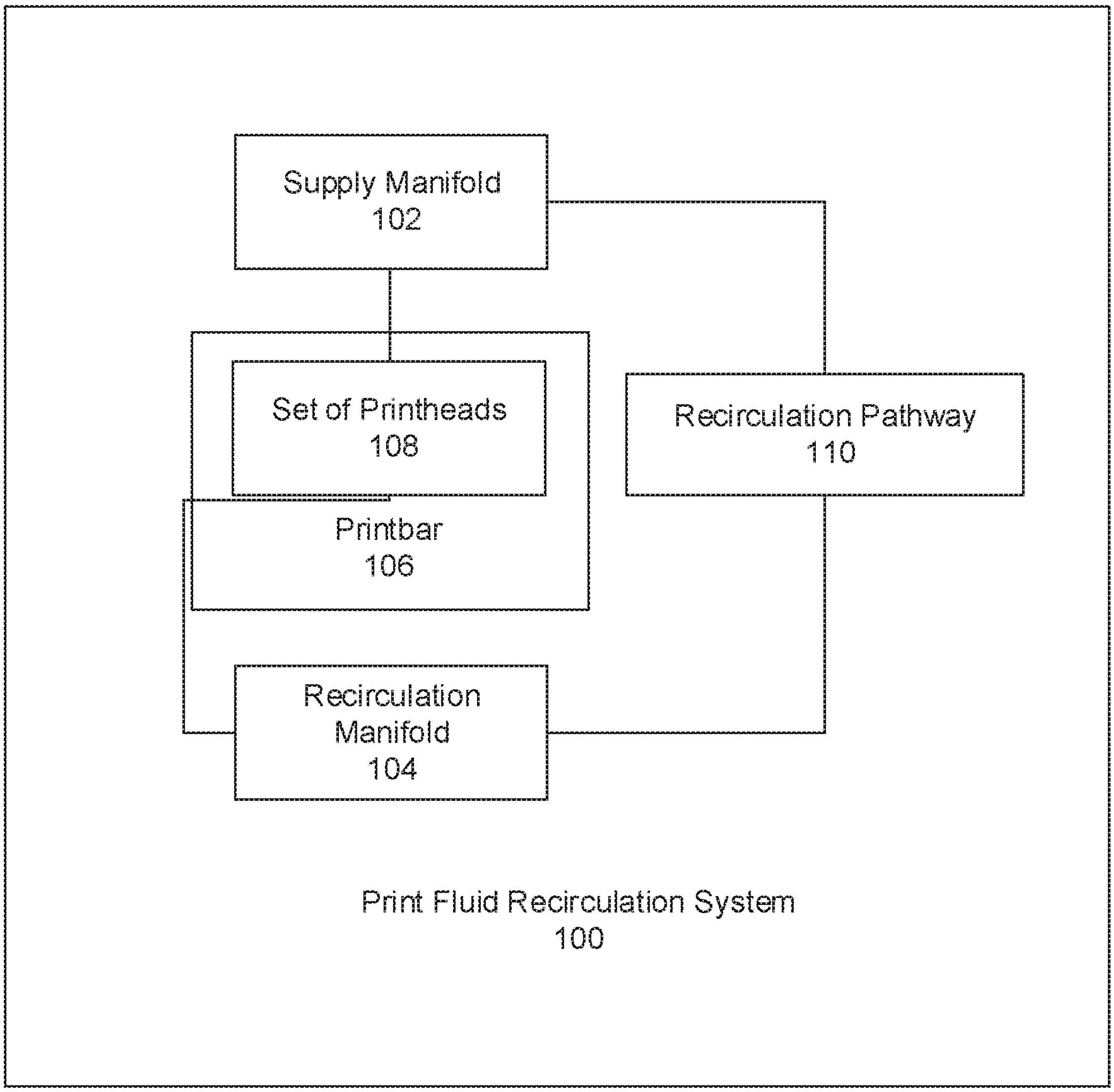
FIG. 1 is a block diagram depicting an example of a system for print fluid recirculation.

FIG. 1 is a block diagram depicting an example of a system 100 for print fluid recirculation. Print fluid recirculation system 100 includes a supply manifold 102, a recirculation manifold 104, and a printbar 106. The printbar 106 includes a set of printheads 108 that are in fluid communication with one another, with the supply manifold 102, and with the recirculation manifold 104. As used herein, a "supply manifold" refers generally to a pipe, tube, or chamber that is to receive print fluid via connected tubing through an intake opening and that branches into or connects to several distribution openings through which print fluid is to be supplied to a set of printheads. As used herein, a "recirculation manifold" refers generally to a pipe, tube, or chamber that branches into or connects to several collection openings through which print fluid is to be received from a set of printheads, and having a delivery opening through which the print fluid is to be moved via connected tubing to a recirculation pathway. In various examples, the supply and/or recirculation manifolds may include valves or interfaces to electronic networks for controlling movement of print fluid through the manifolds.

As used herein, a "printbar" refers generally to an element or structure that holds a set of printheads. In examples, a printbar may hold a set of printheads wherein each printhead is to eject print fluid of a same color or other attribute. As used herein, a "printhead" refers generally to a mechanism for ejection of a liquid, e.g., a print fluid. Examples of printheads are drop on demand printheads, such as piezoelectric printheads and thermo resistive printheads. As used herein, "print fluid" refers generally to any liquid that can be applied upon a substrate by a printer during a printing operation, e.g., a print fluid ejection operation, including but not limited to inks, primers and overcoat materials (such as a varnish), water, and solvents other than water. As used herein an "ink" refers generally to a liquid that is to be applied to a substrate during a printing operation, e.g., a print fluid ejection operation, to form an image upon the substrate. As used herein, a primer refers generally to a substance that is applied to a substrate as a preparatory coating in advance of an application of ink or another image-forming print fluid to a substrate.

System 100 includes a recirculation pathway 110 in fluid connection with the supply manifold 102 and the recirculation manifold 104. As used herein a first component being in "fluid connection with" or "fluidly connected to" a second component refers generally to the first and second components being connected in a manner that a fluid is enabled to flow from the first to the second component, or the reverse. The recirculation pathway 110 is to enable recirculation of print fluid at a controlled and consistent flow through the set of printheads 108. In examples, the recirculation pathway 110 includes conduit, tubing, or piping, and the fluid connection may be established via the tubing, conduit, or piping. In examples, the recirculation pathway may include other elements such a vacuum regulator, an electronic pressure regulator component, a recirculation isolation valve, and/or a recirculation pump.

In a particular example of the print recirculation system 100, a first printbar is to eject print fluid of a first color, and a second printbar is to eject print fluid of a second color. In this example, a first recirculation pathway is in fluid connection with a first supply manifold and first recirculation manifold and is to enable recirculation of print fluid of a first color at a controlled consistent flow through the first printbar. In this example, a second recirculation pathway is in fluid connection with a second supply manifold and second recirculation manifold and is to enable recirculation of print fluid of a second color at a controlled consistent flow through the second printbar. In this manner, the disclosed system 100 can enable automatic recirculation of print fluids of varying colors among color-dedicated printheads.

In some examples, the printheads may include internal pressure regulators to regulate the flow of print fluid coming from the supply manifold into the printheads. The printheads may also include an internal check valve at the exit of the printhead, the check valve to prevent print fluid from traveling from the recirculation manifold to the printhead, but allowing for the print fluid to travel from the printhead to the recirculation manifold when the recirculation pathway is enabled. The internal regulation of the printheads provided by these components can promote a balance of positive pressure to the nozzles that are to eject print fluid and a vacuum pressure to pull the un-ejected print fluid through the check valve and into the recirculation manifold.

In some examples, when the recirculation pathway is closed, the print fluid is to travel through the supply manifold(s) of the printbar(s) and back to the reservoir, bypassing the printheads altogether. In examples, when the recirculation pathway is open, some of the print fluid is to travel along this path, but another portion of print fluid is to travel through the printheads and into the recirculation pathway and back to the reservoir. In examples, when print fluid is ejected during a printing operation, the internal pressure regulator of the printhead allows more print fluid to flow through the printhead as print fluid is ejected, while the vacuum pressure at the outlet of the printheads remains the same to keep the flow of print fluid leaving the printheads constant (or within a certain range or tolerance) during a printing or a non-printing operation. In examples, a printheads internal pressure regulation system may serve to balance or regulate the positive pressure and negative pressure events at the nozzles of the printheads, where a lack of such balancing or regulation might result in print defects, nonuniform thermal behavior, and de-priming of nozzles.

Figure 2:
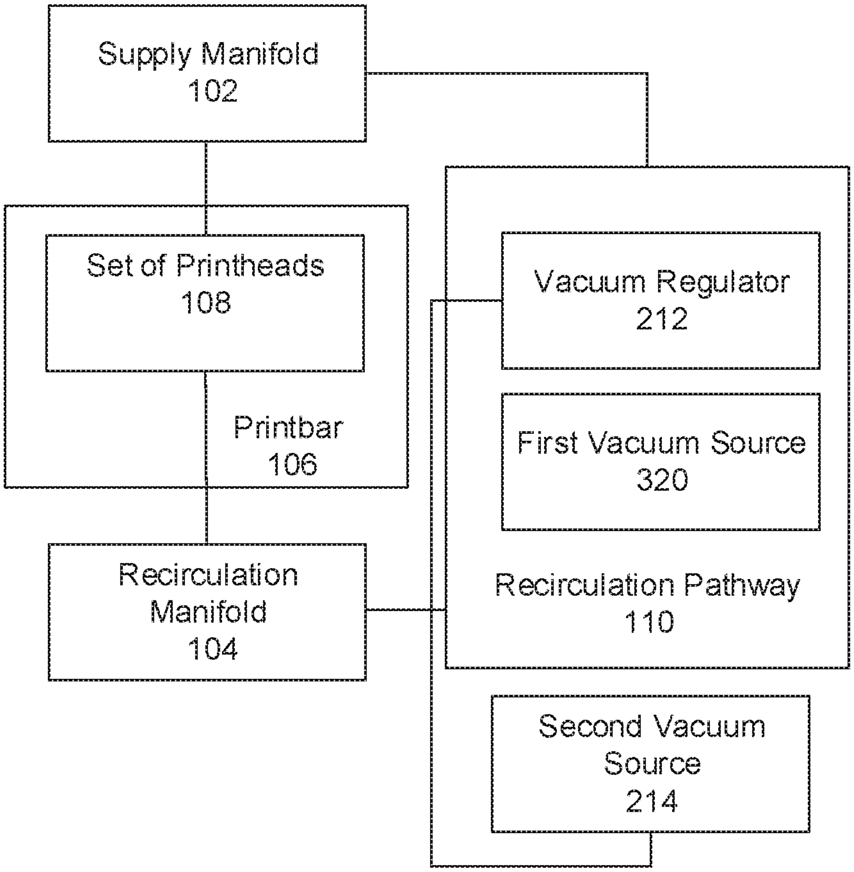
FIG. 2 is a block diagram depicting another example of a system for print fluid recirculation.

FIG. 2 is a block diagram depicting another example of a system for print fluid recirculation 100. This example is similar to FIG. 1, with a difference that recirculation pathway 110 includes a vacuum regulator 212 and a first vacuum source 320. The first vacuum source is in fluid communication with the recirculation manifold 104, and is to cause application of a negative pressure to the recirculation manifold. The vacuum regulator 212 is in fluid communication with the recirculation manifold, the first vacuum source, and a second (sometimes referred to herein a as "secondary") vacuum source 214. The vacuum regulator 212 together with the second vacuum source 214 are for adjusting the negative pressure applied to the recirculation manifold by the first vacuum source 320.

In examples, each of the first vacuum source 320 and the second vacuum source 214 may be or include any component or system that is to apply a negative pressure to the recirculation pathway. In examples, the vacuum source may be, but is not limited to, a mechanical vacuum pump or a Venturi-type vacuum generator. As used herein, a "vacuum regulator" refers generally to any device that is to maintain a desired vacuum pressure in a system. In examples, the vacuum regulator 212 may be a suction regulator, a back pressure regulator, or a spring-operated regulator. In examples, the vacuum regulator 212 may affect vacuum pressure within system 100 by restricting flow between the first vacuum source 320 and the recirculation manifold 104, and in this manner precisely control the vacuum to a target flow rate. In examples, the vacuum regulator 212 does not allow air or other gas into system 100 as it controls the vacuum pressure. In examples, the vacuum regulator 212 may affect vacuum pressure within system 100 by controlling or restricting vacuum provided by multiple vacuum sources.

Figure 3:
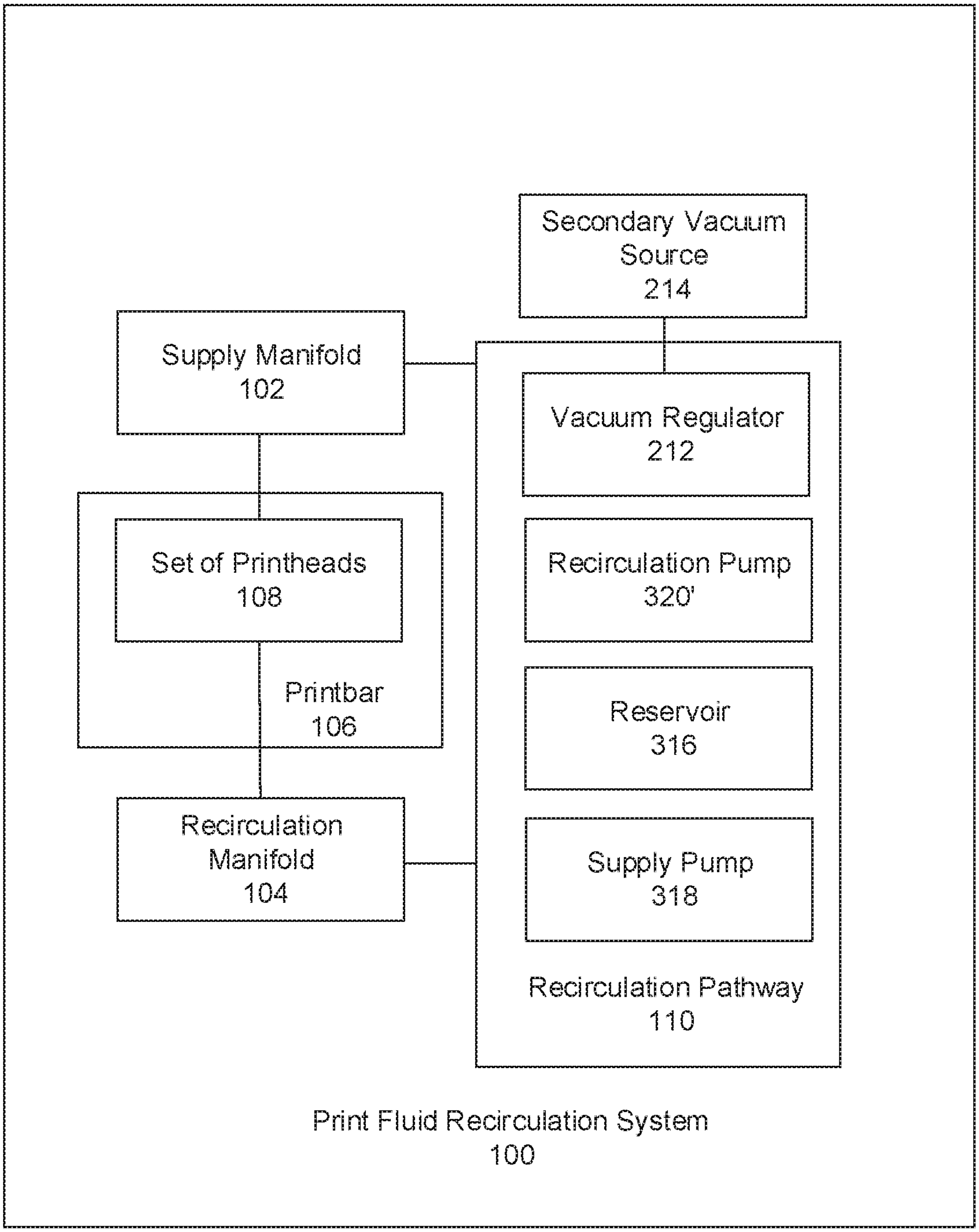
FIG. 3 is a block diagram depicting another example of a system for print fluid recirculation.

FIG. 3 is a block diagram depicting another example of a system for print fluid recirculation 100. This example is similar to FIG. 2, with differences that the system includes a reservoir 316 and a supply pump 318, and that the first vacuum source is a recirculation pump 320'. The recirculation pump 320' is to pump print fluid that has passed through the recirculation manifold 104 and the vacuum regulator 212 into the reservoir 316.

As used herein, a "pump" refers generally to any mechanical device or electromechanical device that utilizes pressure or suction to raise or move a fluid through a system. In examples, the recirculation pump 320' may be or include a positive-displacement pump, a centrifugal pump, an axial-flow pump, or any other pump type.

As used herein, a "reservoir" is used synonymously with a container and may be any tank, bin, barrel, or other receptacle for holding a fluid. In examples, reservoir 316 may include a floor, walls, and/or cap formed from a plastic. In other examples, a floor, walls, and/or cap of the reservoir 316 may be made of metal, or include metal supports. In examples, reservoir 316 is to hold print fluid and may be constructed to be rigid so as to discourage expansion and/or contraction of the reservoir due to pressures in the recirculation pathway 110. In other examples, reservoir 316 is to hold print fluid and may be constructed to be flexible so as to allow expansion and/or contraction of the reservoir due to pressures in the recirculation pathway 110.

The supply pump 318 is in fluid connection with the reservoir 316 and the supply manifold 102 and is for pumping the print fluid from the reservoir 316 to the supply manifold 102. In examples, the supply pump 318 may be or include a positive-displacement pump, a centrifugal pump, an axial-flow pump, or any other pump type.

Figure 4:
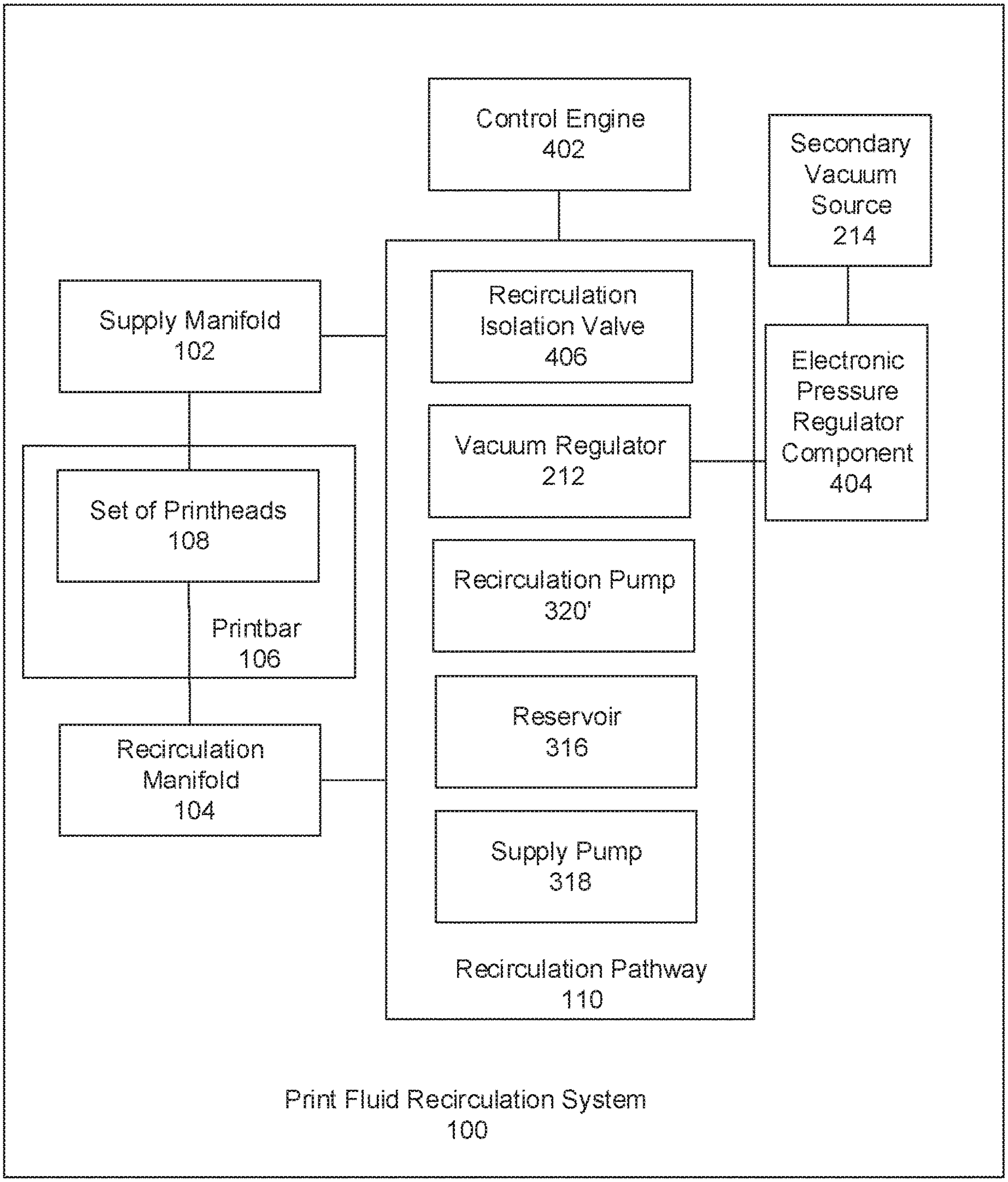
FIG. 4 is a block diagram depicting another example of a system for print fluid recirculation.

FIG. 4 is a block diagram depicting another example of a system for print fluid recirculation. In FIG. 4 a component is identified as engine 402. In describing engine 402 focus is on the engine's designated function. However, the term engine, as used herein, refers generally to hardware and/or programming to perform a designated function. As is illustrated with respect to FIG. 5, the hardware of the engine, for example, may include one or both of a processor and a memory, while the programming may be code stored on that memory and executable by the processor to perform the designated function.

In the example of FIG. 4, print fluid recirculation system 100, in addition to the components described with respect to FIG. 3, includes a control engine 402, an electronic pressure regulator component 404, and a recirculation isolation valve 406. Control engine 402 represents generally a combination of hardware and programming to control the recirculation pump 320' (or any other form of the first vacuum source 320 (FIG. 3)) and the vacuum regulator 212 to provide a consistent target vacuum pressure to the recirculation manifold 104 as print fluid is moved through the set of printheads 108. In an example, the control engine 402 may also be to control operation of the supply pump 318.

Continuing with the example of FIG. 4, system 100 includes an electronic pressure regulator component 404 that is in fluid communication with, and situated between, the vacuum regulator 212 and the secondary vacuum source 214. In this example, the electronic pressure regulator component 404 is to cause provision of a pilot pressure to the vacuum regulator 212. The pilot pressure is to cause the vacuum regulator 212 to maintain a recirculation pathway negative pressure that is proportionate to the pilot pressure. In examples the control engine 402 is to control the electronic pressure regulator component 404. In this manner, the control engine 402 may control the recirculation pathway negative pressure to maintain a consistent target pressure at the recirculation manifold 104. In certain examples the target pressure may be equal to the pilot pressure. In certain other examples, the target pressure may be affected by changes in the pilot pressure, with the target pressure being less than the pilot pressure. In an example, the electronic pressure regulator component 404 may include valves, e.g., a push valve and/or a vent valve, to control the vacuum pressure to the target level. In an example, the electronic pressure regulator component 404 may include internal pressure sensors for measuring the vacuum pressure, and programming for adjusting the timing of the valves to maintain the target pressure.

In other examples, print fluid recirculation system 100 may include one or more vacuum regulators that include components and programming such the control engine 402 can directly control the vacuum regulator to maintain a negative pressure in the recirculation pathway 110 at a consistent target pressure. In such examples, the vacuum regulator may include internal pressure sensors for measuring the vacuum pressure and programming for adjusting the timing of the valves to maintain the target pressure. The example of FIG. 3 provides such a vacuum regulator 212 with electronic pressure regulator control functionality, without having a distinct electronic pressure regulator component situated between the vacuum regulator 212 (FIG. 3) and the secondary vacuum source 214 (FIG. 3).

Continuing with the example of FIG. 4, the print fluid recirculation pathway 110 includes a recirculation isolation valve 406 that is in fluid communication with the recirculation manifold 104. The recirculation isolation valve 406 is to enable print fluid to move from the recirculation manifold 104 to the reservoir 316 when the recirculation isolation valve is open. The recirculation isolation valve 406 is to not enable print fluid to move from the recirculation manifold 104 to the reservoir 316 when the recirculation isolation valve 406 is closed. In examples, the recirculation valve 406 does not obstruct or impede movement of the print fluid along an ejection operation print fluid return pathway to the reservoir 316 during a print fluid ejection operation. As used herein, a "print fluid ejection operation" refers generally to an operation at a printer wherein print fluid is being ejected from printheads upon a substrate to form an image, or upon a substrate or maintenance element for purposes of servicing the printheads. An example of ejecting fluid from printheads for servicing purposes is causing the printheads to "spit" or eject print fluid upon a substrate or maintenance element (e.g., a service station element) to discourage drying of print fluid in the nozzles. In certain examples, the recirculation pathway 110 may include a shared pathway portion that includes common or same tubing or conduit as that is included in the ejection operation print fluid return pathway (see e.g., the shared pathway portion 110*a* of FIG. 9).

Figure 5:
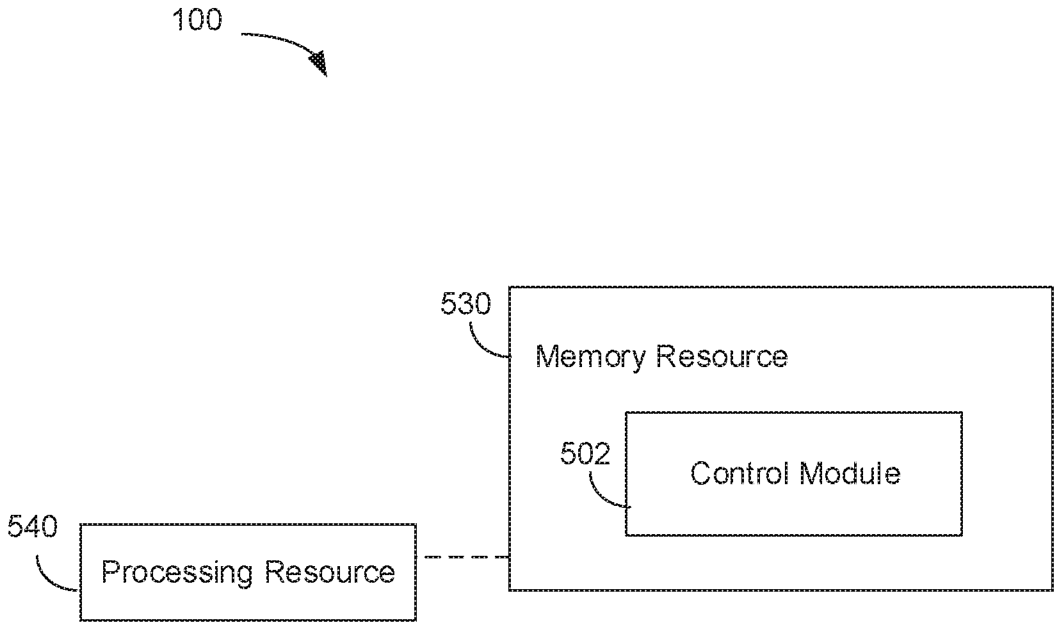
FIG. 5 is a block diagram depicting a memory resource and a processing resource to implement an example of a method for print fluid recirculation.

In the foregoing discussion of FIGS. 4 and 5, control engine 402 was described as a combination of hardware and programming. Control engine 402 may be implemented in a number of fashions, Looking at FIG. 5 the programming may be processor executable instructions stored on a tangible memory resource 530 and the hardware may include a processing resource 540 for executing those instructions. Thus, memory resource 530 can be said to store program instructions that when executed by processing resource 540 implement system 100 of FIGS. 4 and 5.

Memory resource 530 represents generally any number of memory components capable of storing instructions that can be executed by processing resource 540. Memory resource 530 is non-transitory in the sense that it does not encompass a transitory signal but instead is made up of a memory component or memory components to store the relevant instructions, Memory resource 530 may be implemented in a single device or distributed across devices. Likewise, processing resource 540 represents any number of processors capable of executing instructions stored by memory resource 530. Processing resource 540 may be integrated in a single device or distributed across devices. Further, memory resource 530 may be fully or partially integrated in the same device as processing resource 540, or it may be separate but accessible to that device and processing resource 540.

In one example, the program instructions can be part of an installation package that when installed can be executed by processing resource 540 to implement system 100. In this case, memory resource 530 may be a portable medium such as a CD, DVD, or flash drive or a memory maintained by a server from which the installation package can be downloaded and installed. In another example, the program instructions may be part of an application or applications already installed, Here, memory resource 530 can include integrated memory such as a hard drive, solid state drive, or the like.

In FIG. 5, the executable program instructions stored in memory resource 530 are depicted as control module 502. Control module 502 represents program instructions that when executed by processing resource 540 may perform any of the functionalities described above in relation to control engine 402 of FIG. 4.

Figure 6:
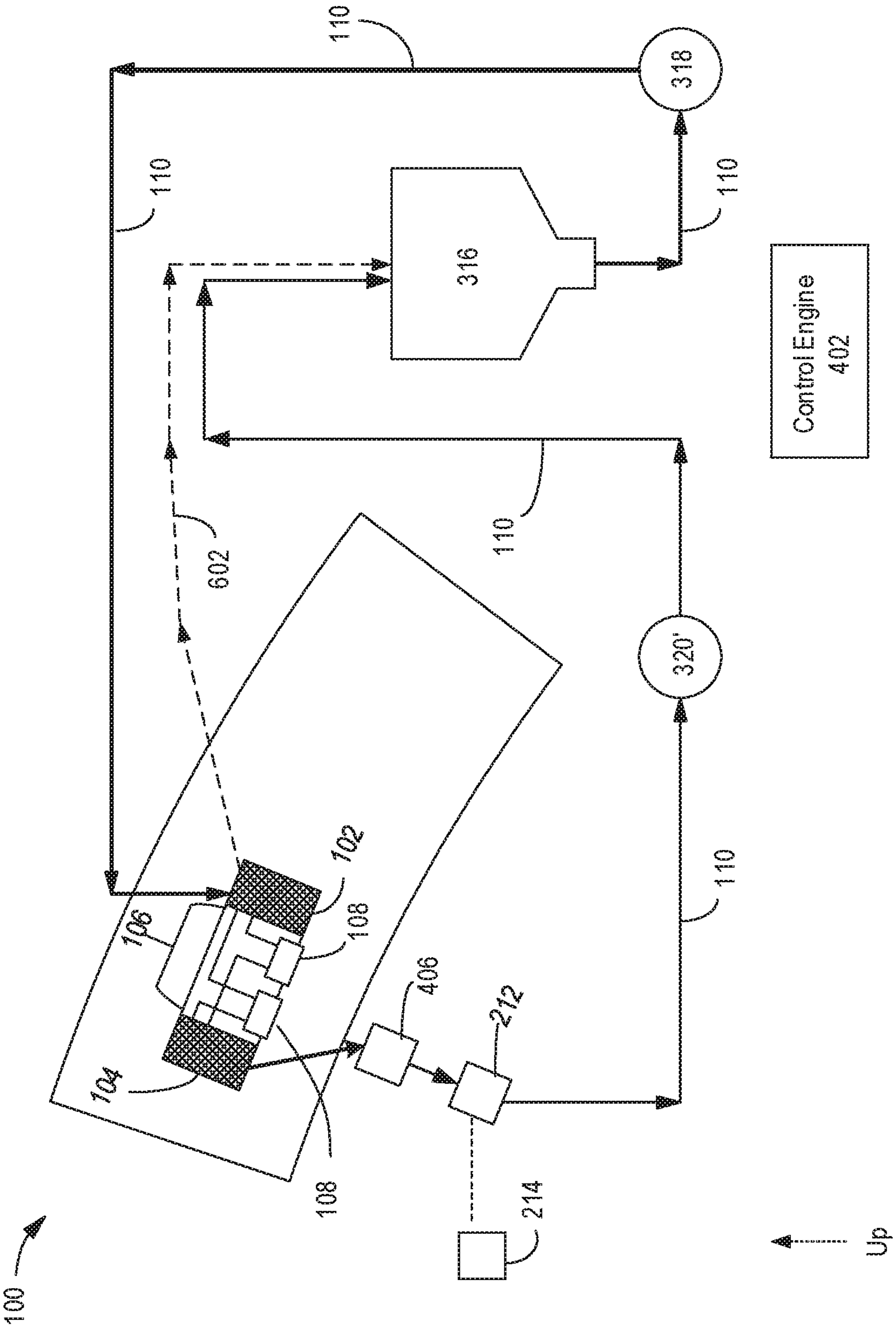
FIG. 6 is a simple schematic diagram that illustrates an example of a system for print fluid recirculation.

FIG. 6 is a simple schematic diagram that illustrates an example of a system for print fluid recirculation. In the example of FIG. 6 print fluid recirculation system 100 includes a supply manifold 102, a recirculation manifold 104, a printbar 106, and a recirculation pathway 110. The printbar 106 includes a set of inkjet printheads 108 that are in fluid communication with one another, with the supply manifold 102, and with the recirculation manifold 104. In this example, each printhead of the set of printheads 108 is to eject print fluid of a same color or other attribute.

The recirculation pathway 110 is in fluid connection with the supply manifold 102 and the recirculation manifold 104. The recirculation pathway may include conduit, tubing, or piping and is to enable recirculation of print fluid at a consistent flow through the set of printheads 108. In this example, the recirculation pathway 110 includes a recirculation isolation valve 406, a vacuum regulator 212 in fluid connection with a first vacuum source that is a recirculation pump 320, a secondary vacuum source 214, a reservoir 316, and a supply pump 318.

Continuing at FIG. 6, the recirculation isolation valve 406 is in fluid communication with, and positioned between, the recirculation manifold 104 and the vacuum regulator 212. The recirculation isolation valve 406 is to enable print fluid to move from the recirculation manifold 104 to the vacuum regulator 212 and the reservoir 316 when the recirculation isolation valve is open. The recirculation isolation valve 406 is to not enable print fluid to move from the recirculation manifold 104 to the vacuum regulator 212 and the reservoir 316 when the recirculation isolation valve 406 is closed. In examples, when the recirculation isolation valve 406 is closed, and the print fluid access to the vacuum regulator 212 and the reservoir 316 via the print fluid recirculation pathway 110 is thereby blocked, movement of the print fluid between the printheads of the set of printheads 108, and along an ejection operation print fluid return pathway 602 to the reservoir 316 during a print fluid ejection operation, is not impeded or obstructed.

In this example the ejection operation print fluid return pathway 602 and the print fluid recirculation pathway 110 are distinct or separate pathways to the reservoir 316, without an intersection point. In other examples, at least a portion of the recirculation pathway may be a shared pathway (see e.g., the shared pathway portion 110*a* of FIG. 9) along common or same tubing as the tubing that is included in the recirculation pathway 110.

The vacuum regulator 212 is in fluid communication with the recirculation manifold 104, the first vacuum source recirculation pump 320, and the secondary vacuum source 214. The vacuum regulator 212 together with the secondary vacuum source 214 are for adjusting the negative pressure applied to the recirculation manifold by the recirculation pump 320'. In examples, the vacuum regulator 212 does not allow air or other gas into the print fluid recirculation system 100 as the vacuum regulator is used in adjusting the vacuum pressure.

Continuing at FIG. 6, recirculation pump 320' is in fluid communication with the reservoir 316 and the vacuum regulator 212 and is to pump print fluid that has passed through the vacuum regulator 212 into the reservoir 316. Supply pump 318 is in fluid connection with the reservoir 316 and the supply manifold 102 and is for pumping the print fluid from the reservoir 316 to the supply manifold 102.

Control engine 402 represents generally a combination of hardware and programming to control the first vacuum source recirculation pump 320' and the vacuum regulator 212 to provide a controlled and consistent target vacuum pressure as print fluid is moved through the set of printheads 108. In this example, the control engine 402 may also control operation of the recirculation pump 320' to accomplish movement of print fluid into the reservoir 316. In the example of FIG. 6, the recirculation pathway 110 is such that the print fluid is to be caused to move upward against gravity for a portion of the recirculation pathway 110 and into the reservoir 316. In examples such pressure may be between 1.0 psi and 75.0 psi.

Continuing at FIG. 6, in this example the control engine 402 may also control operation of the supply pump 318 to cause the print fluid to be moved from the reservoir 316 to the supply manifold 102 at a pressure that is optimal for the print fluid recirculation and that does not damage the printheads 108, In examples such pressure may be between 1.0 psi and 150.0 psi. In this example, the supply pump 318 Is to cause movement of the print fluid, through the print fluid recirculation pathway 110, and into the supply manifold 102. In this example, the recirculation pathway 110 is such that the supply pump 318 is to cause the print fluid to move upward against gravity through a portion of the recirculation pathway and then into the supply manifold 102.

In an example, the vacuum regulator 212 includes components and programming such the control engine 402 can directly control the vacuum regulator to maintain a negative pressure at the recirculation manifold 104, and accordingly at the set of printheads 108, at a consistent target pressure that will not damage the printheads 108 or otherwise cause image quality issues when the printheads are to be used in a print fluid ejection operation. In examples the target pressure at the recirculation manifold may be between −0.1 psi and −10.0 psi. In examples the target pressure at the set of printheads may be between −0.1 psi and −10.0 psi. In examples the target negative pressure at the set of printheads may vary according to printhead type and architecture. The vacuum regulator 212 may include internal pressure sensors for measuring the vacuum pressure and programming for adjusting the timing of the valves to maintain the target pressure.

Figure 7:
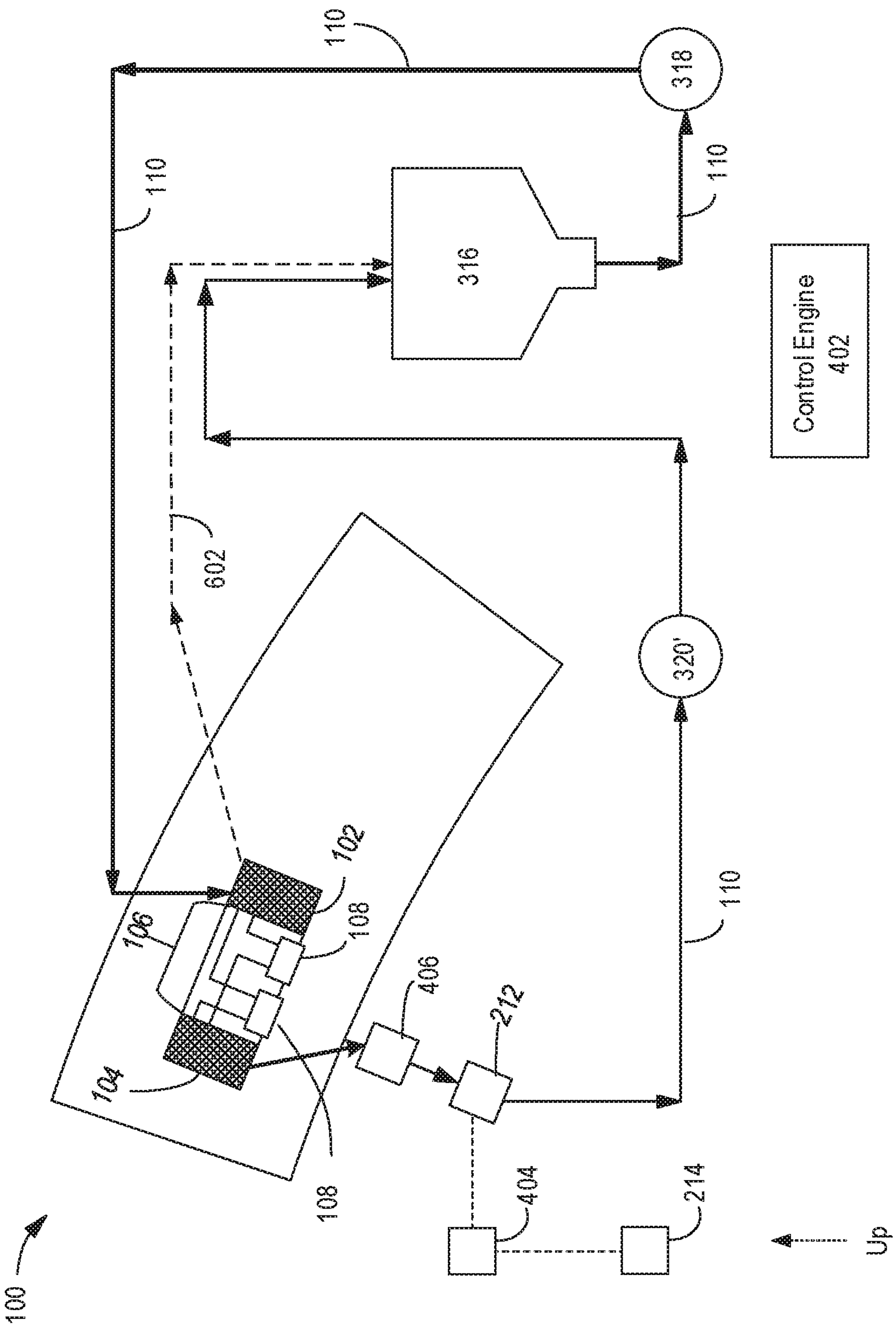
FIG. 7 is a simple schematic diagram that illustrates an example of a system for print fluid recirculation that includes an electronic pressure regulator component.

FIG. 7 is a simple schematic diagram that illustrates an example of a system for print fluid recirculation. The example system of FIG. 7 is similar to that of FIG. 6, with a difference that the system 100 additionally includes an electronic pressure regulator component 404 that is in fluid communication with, and situated between, the vacuum regulator 212 and the secondary vacuum source 214. In the example of FIG. 7, the electronic pressure regulator component 404 is a component physically separated and distinct from the vacuum regulator 212. The electronic pressure regulator component 404 is to, in conjunction with the secondary vacuum source 214, cause provision of a pilot pressure to the vacuum regulator 212. The pilot pressure is to enable the vacuum regulator 212 to establish a consistent target negative pressure at the recirculation manifold 104 and/or the printheads 108 in that is equal to or proportionate to the pilot pressure.

In the example of FIG. 7, the control engine 402 is to control the electronic pressure regulator component 404. In this manner, the control engine 402 may control a negative pressure within a portion of the recirculation pathway upstream of the recirculation pump 320' (relative to print fluid flow direction) to maintain a consistent target pressure at the recirculation manifold and the printheads.

Figure 8:
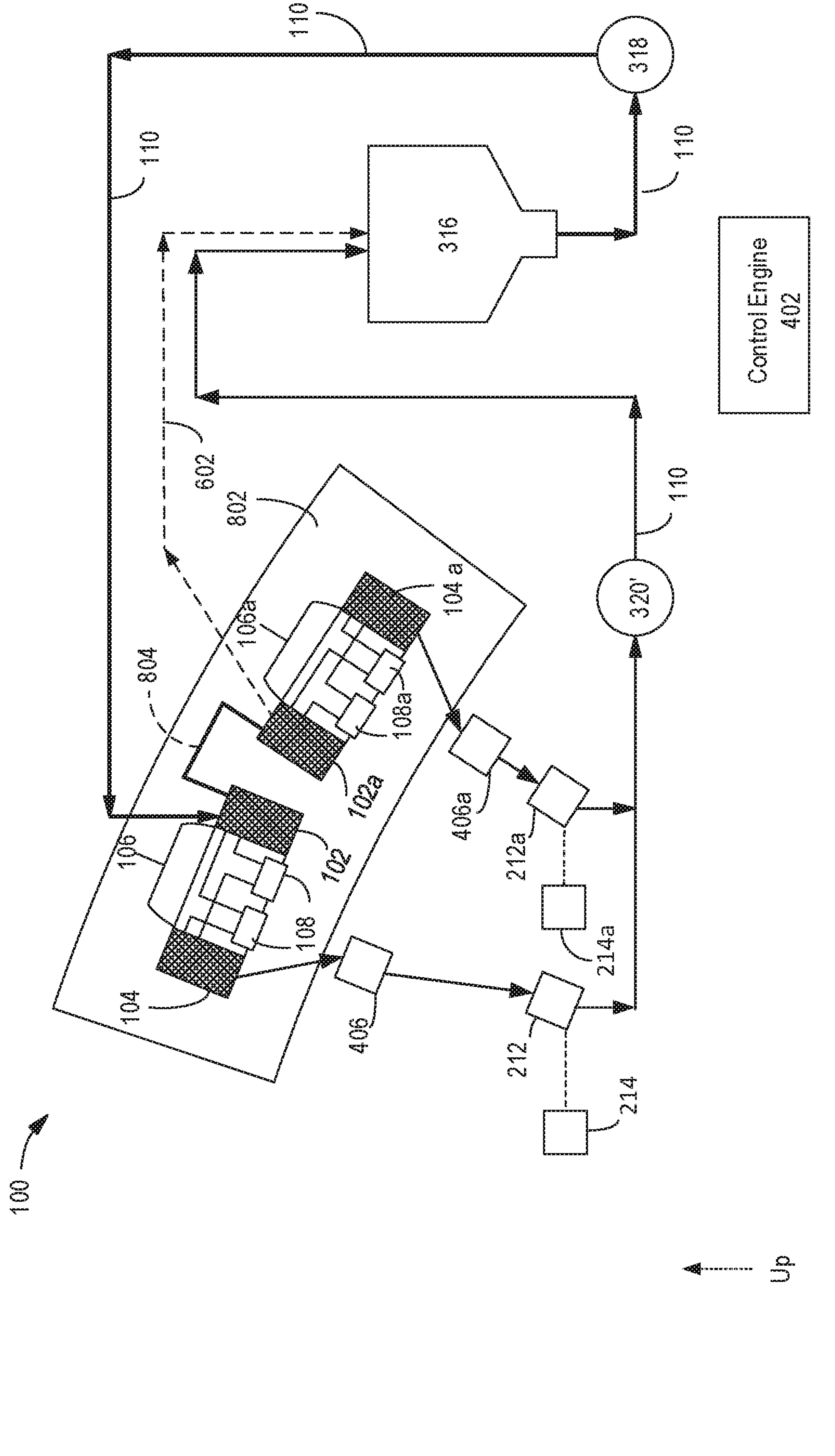
FIG. 8 is a simple schematic diagram that illustrates an example of a system for print fluid recirculation for multiple printbars in fluid connection with one another.

FIG. 8 is a simple schematic diagram that illustrates another example of a system for print fluid recirculation. The example system of FIG. 8 is similar to that of FIG. 7, with a difference that the print fluid recirculation system 100 additionally includes a second supply manifold 102*a*, a second recirculation manifold 104*a*, a second printbar 106*a*, a second recirculation isolation valve 406*a*, a second vacuum regulator 212*a*, and a vacuum source 214*a*. The second printbar 106*a* includes a second set of inkjet printheads 108*a* that are in fluid communication with one another, with the second supply manifold 102*a*, and with the second recirculation manifold 104*a*. The second supply manifold 102*a* is in fluid connection with the first supply manifold 102 via a supply manifolds bridge 804. In examples, the supply manifolds bridge may be or include a conduit, tubing, or piping.

In this example, the second print bar 106*a* is positioned on a same printbar support element 802 as the first printbar 106. In this example, the printbar support element 802 has the shape of an arch portion. In other examples the print support element may be in the shape of another vertical curved structure. In other examples, the first and second printheads may be situated upon a support element so as to be aligned horizontally and at the same level. In other examples, the first printbar and the second printbar may be situated upon separate printbar support elements. In this example, each printhead of the first and second set of printheads 108 108*a* are to eject print fluid of a same color or other attribute.

Continuing at FIG. 8, the second recirculation isolation valve 406*a* is in fluid communication with, and positioned between, the second recirculation manifold 104*a* and the second vacuum regulator 212*a*. The second recirculation isolation valve 406*a* is to enable print fluid to move from the second recirculation manifold 104*a* to the second vacuum regulator 212*a* and the reservoir 316 when the second recirculation isolation valve 406*a* is open. The second recirculation isolation valve 406*a* is to not enable print fluid to move from the second recirculation manifold 104*a* to the second vacuum regulator 212*a* and the reservoir 316 when the second recirculation isolation valve 406*a* is closed. In examples, when the second recirculation isolation valve 406*a* is closed, and the print fluid access to the vacuum regulator 212*a* and the reservoir 316 is in this manner blocked, movement of the print fluid between the printheads of the second set of printheads 108*a*, and along an ejection operation print fluid return pathway 602 to the reservoir 316 during a print fluid ejection operation, is not obstructed or otherwise impeded.

Second vacuum regulator 212*a* is in fluid communication with the second recirculation manifold 104*a*. Second vacuum regulator 212*a* together with the vacuum source 214*a* are to cause application of a negative pressure to the second recirculation manifold 104*a* and in this manner move print fluid through the set of second printheads 108*a*, through the second recirculation manifold 104*a*, and through the second vacuum regulator 212*a* in succession. In this example, the second vacuum regulator 212*a* is to control vacuum pressure within system 100 by restricting flow between the secondary vacuum source 214*a* and the second recirculation manifold 104*a*, and thereby precisely control the vacuum to a consistent target flow rate.

Recirculation pump 320 is in fluid communication with the reservoir 316 and the first and second vacuum regulators 212 212*a* and is to pump print fluid that has passed through the first vacuum regulator 212 and/or the second vacuum regulator 212*a* into the reservoir 316. Supply pump 318 is in fluid connection with the reservoir 316 and the first supply manifold 102 and is for pumping the print fluid from the reservoir 316 to the first supply manifold 102.

Control engine 402 represents generally a combination of hardware and programming to control the first vacuum regulator's 212 application of a negative pressure to the first recirculation manifold 104 to provide a consistent target vacuum pressure as print fluid is moved through the first set of printheads 108, and to control the second vacuum regulator's 212*a* application of a negative pressure to the second recirculation manifold 104*a* to provide a consistent target vacuum pressure as print fluid is moved through the second set of printheads 108*a*.

Figure 9:
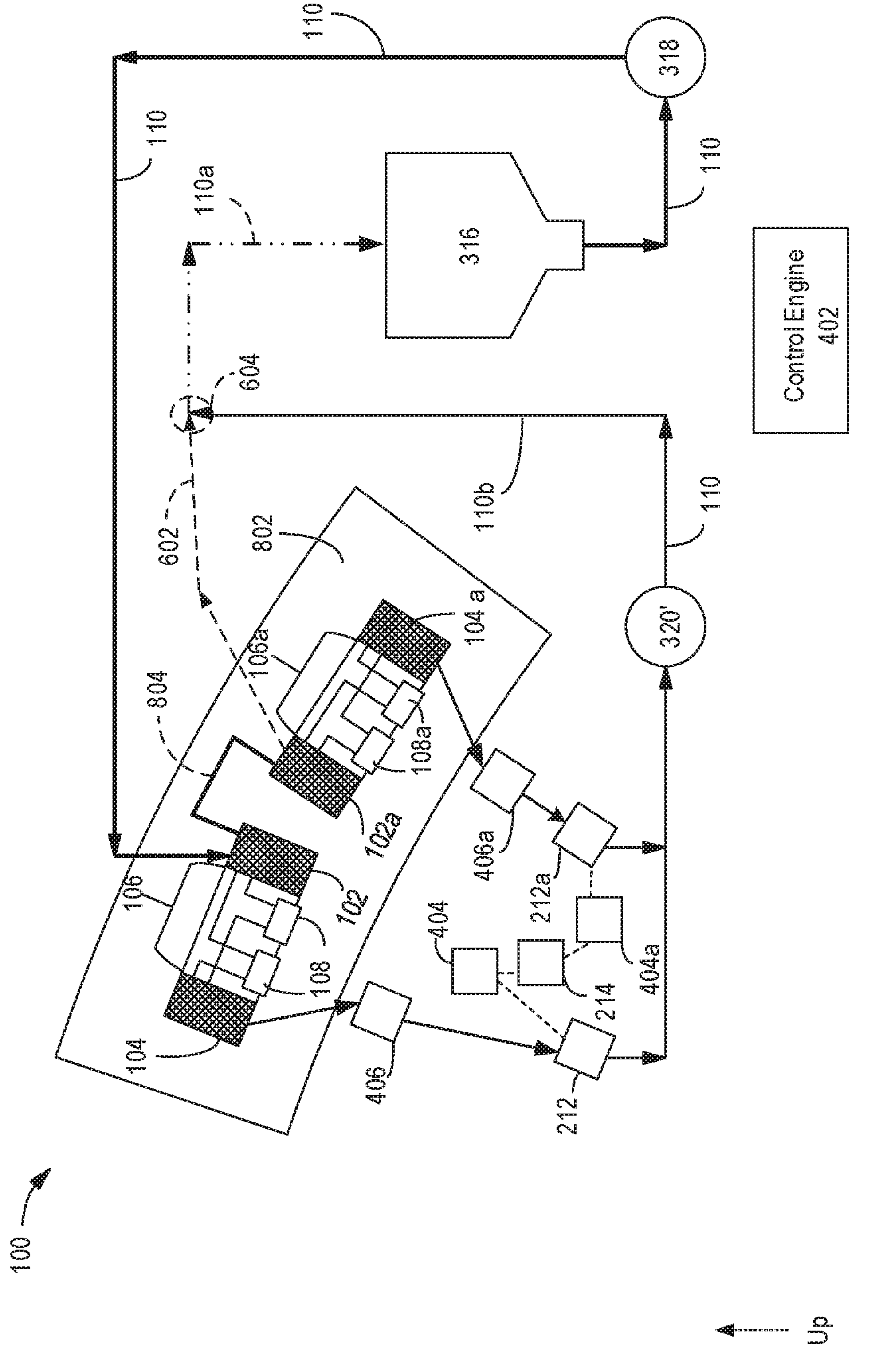
FIG. 9 is a simple schematic diagram that illustrates an example of a system for print fluid recirculation for multiple printbars in fluid connection with one another that includes electronic pressure regulator components.

FIG. 9 is a simple schematic diagram that illustrates an example of a system for print fluid recirculation. The example system of FIG. 9 is similar to that of FIG. 8, with differences that the print fluid recirculation system 100 additionally includes a first electronic pressure regulator component 404 and a second electronic pressure regulator component 404*a*, and that a secondary vacuum source 214 is utilized to provide vacuum to both first electronic pressure regulator component 404 and a second electronic pressure regulator component 404*a*. In this example, the first electronic pressure regulator component 404 is in fluid communication with, and situated between, the first vacuum regulator 212*a* and the secondary vacuum source 214.

The first electronic pressure regulator component 404 is to provide a pilot pressure to the first vacuum regulator 212. The pilot pressure provided by the first electronic pressure regulator component 404 is to cause the first vacuum regulator 212 to maintain a negative pressure that is proportionate to the pilot pressure. The control engine 402 is to control the first electronic pressure regulator component 404 to maintain a consistent target pressure at the second recirculation manifold 104 and the second set printheads 108.

The second electronic pressure regulator component 404*a* is in fluid communication with, and situated between, the second vacuum regulator 212*a* and the secondary vacuum source 214. The second electronic pressure regulator component 404*a* is to provide a pilot pressure to the second vacuum regulator 212*a*. The pilot pressure provided by the second electronic pressure regulator component 404*a* is to cause the second vacuum regulator 212*a* to maintain a recirculation pathway negative pressure that is proportionate to the pilot pressure. The control engine 402 is to control the second electronic pressure regulator component 404*a* to maintain a consistent target pressure at the second recirculation manifold 104*a* and the second set printheads 108*a*.

In the example of FIG. 9, the ejection operation print fluid return pathway 602 includes a shared pathway portion 110*a* wherein a same or common tubing or conduit that is also included in the print fluid recirculation pathway 110. In this example, the tubing of the ejection operation print fluid return pathway 602 and the print fluid recirculation pathway 110 intersect at a fitting component 604, with the shared tubing of shared pathway portion 110*a* to support the movement of print fluid to the reservoir according to both the ejection operation print fluid return pathway 602 and the print fluid recirculation pathway 110.

Figure 10:
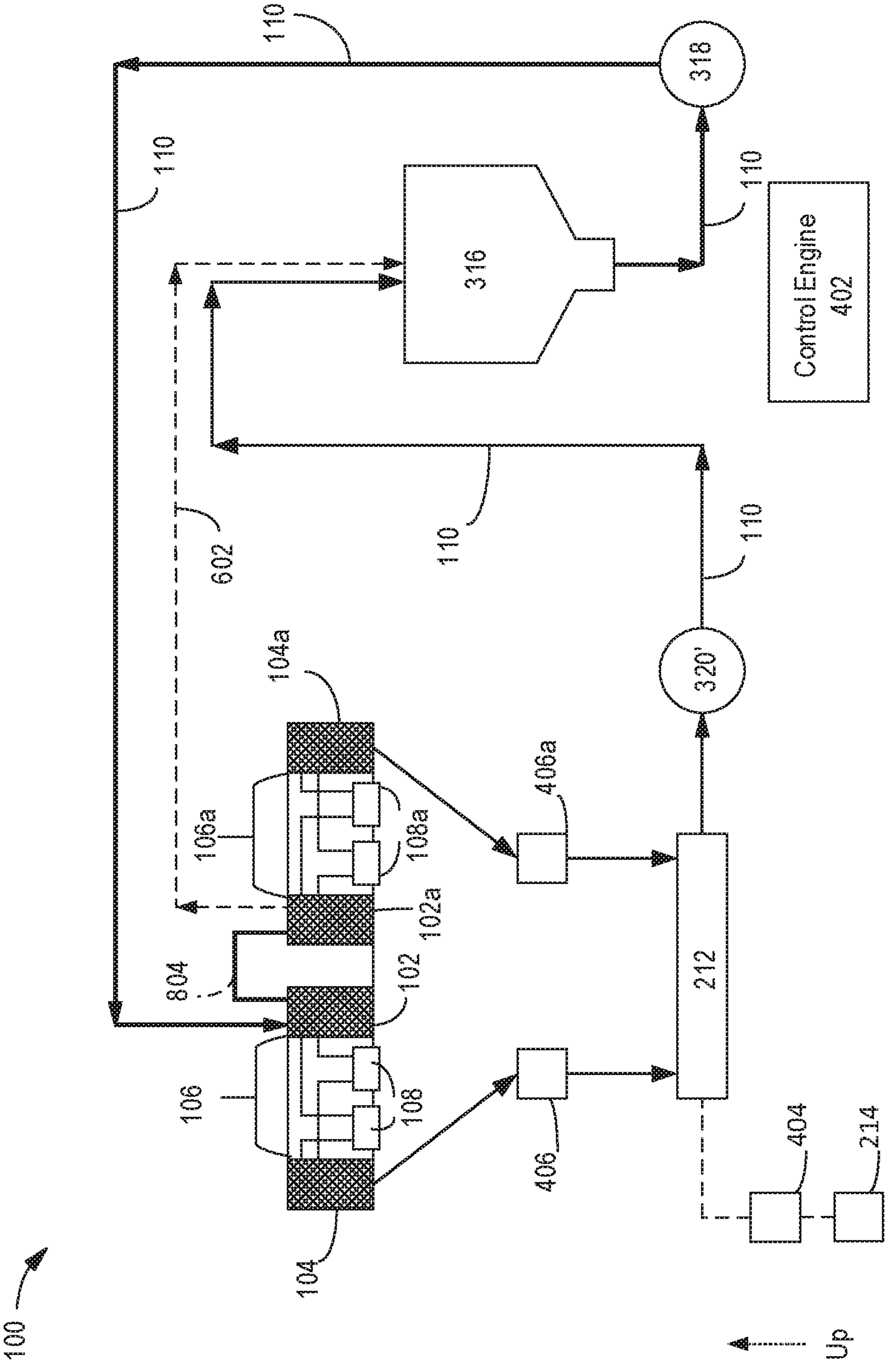
FIG. 10 is a simple schematic diagram that illustrates another example of a system for print fluid recirculation for multiple printbars that are in fluid connection with one another and arranged at a same height.

FIG. 10 is a simple schematic diagram that illustrates an example of a system for print fluid recirculation. In this example, the first and second printbars 106 106*a* are positioned horizontally and at a same height, rather than upon arched or curved support member as in FIGS. 7-8, and are to eject print fluid of a same color or other attribute. In this example, the recirculation pathway includes the first and second supply manifolds 102 102*a*, the first and second recirculation isolation valves 406 406*a*, a vacuum regulator 212, and a recirculation pump 320'. The second supply manifold 102*a* is in fluid connection with the first supply manifold 102 via a supply manifolds bridge 804. The first and second vacuum regulators 102 102*a* are in fluid connection with a shared electronic pressure regulator component 404.

Continuing at FIG. 10, the first recirculation isolation valve 406 is in fluid communication with, and positioned between, the first recirculation manifold 104 and the vacuum regulator 212. The first recirculation isolation valve 406 is to enable print fluid to move from the first recirculation manifold 104 to the vacuum regulator 212 when the first recirculation isolation valve 406 is open. The first recirculation isolation valve 406 is to block print fluid from moving from the first recirculation manifold 104 to the vacuum regulator 212 when the first recirculation isolation valve 406 is closed. In examples, when the first recirculation isolation valve 406 is closed, and the print fluid access to the vacuum regulator 112 and the recirculation pathway 110 is blocked, the print fluid movement along an ejection operation print fluid return pathway 602 to the reservoir 316 during a print fluid ejection operation is not blocked.

Vacuum regulator 212 is in fluid communication with the first recirculation manifold 104, Vacuum regulator 212 together with the secondary vacuum source 214 are to cause application of a negative pressure to the first recirculation manifold 104 and in this manner move print fluid through the set of first printheads 108*a*, through the first recirculation manifold 104, and through the vacuum regulator 212 in succession. In this example, vacuum regulator 212 is to regulate vacuum pressure applied to the first and second sets of printheads 108 108*a* by restricting flow between the secondary vacuum source 214 and the first recirculation manifold 104, and thereby precisely control the vacuum to a consistent target flow rate.

Continuing at FIG. 10, the second recirculation isolation valve 406*a* is in fluid communication with, and positioned between, the second recirculation manifold 104*a* and the vacuum regulator 212. The second recirculation isolation valve 406*a* is to enable print fluid to move from the second recirculation manifold 104*a* to the vacuum regulator 212 when the second recirculation isolation valve 406*a* is open. The second recirculation isolation valve 406*a* is to not enable print fluid to move from the second recirculation manifold 104*a* to the vacuum regulator 212 when the second recirculation isolation valve 406*a* is closed. In examples, when the second recirculation isolation valve 406*a* is closed, and the print fluid access to the recirculation pathway 110 via the vacuum regulator is blocked, movement of the print fluid between the printheads of the set of printheads 108, and along an ejection operation print fluid return pathway 602 to the reservoir 316 during a print fluid ejection operation, is not obstructed or otherwise impeded.

Vacuum regulator 212 is in fluid communication with the second recirculation manifold 104*a*. Vacuum regulator 212 together with the secondary vacuum source 214 are to cause application of a negative pressure to the second recirculation manifold 104*a* and to move print fluid through the set of second printheads 108*a*, through the second recirculation manifold 104*a*, and through the vacuum regulator 212 in succession. In this example, vacuum regulator 212 is to control vacuum pressure within system 100 by restricting flow between the vacuum supply 214 and the second recirculation manifold 104*a*, and in this manner precisely control the vacuum to a consistent target flow rate.

In the example of FIG. 10, a single vacuum regulator 212 can be used to affect the negative pressure applied to both the first and second sets of printheads 108 108*a* as the first and second printbars 106 106*a* are positioned with a horizontal attitude and at a same height relative to the floor. In the example of FIG. 10, the negative pressure to be applied to the first recirculation manifold 104 and the negative pressure to be applied to the second recirculation manifold 104*a* may be a same pressure of −0.1 psi to −10.0 psi. As the vertical distance between the first printbar 106 and the first vacuum regulator 212 is the same as the vertical distance between the second printbar 106*a* and the second vacuum regulator 212, differing pressures may not be needed.

To the contrary, in the examples of FIG. 8, wherein the first and second printbars 106 106*a* are situated at differing heights, each of the first and second printbars has a dedicated vacuum regulator to enable different negative pressures and thus compensate for the difference in the heights of the printbars. In the example of FIG. 8, the negative pressure to be applied to the first recirculation manifold 104 (e.g., −1.0 psi to −2.0 psi) may be less than the than the negative pressure to be applied to the second recirculation manifold 104*a* (e.g., −1.5 psi to −2.5 psi) as the effect of gravity assist for the print fluid returning to the recirculation pump 320' from the first printbar 106 is greater than for the second printbar 106*a*.

Recirculation pump 320' is in fluid communication with the reservoir 316 and with the vacuum regulator 212 and is to pump print fluid that has passed through the vacuum regulator 212 into the reservoir 316. Supply pump 318 is in fluid connection with the reservoir 316 and the first supply manifold 102 and is for pumping the print fluid from the reservoir 316 to the first supply manifold 102.

Control engine 402 in this example represents generally a combination of hardware and programming to control the vacuum regulator's 212 application of a negative pressure to the first recirculation manifold 104 to provide a consistent target vacuum pressure as print fluid is moved through the first set of printheads 108, and a same or proportional negative pressure to the second recirculation manifold 104*a* to provide a consistent target vacuum pressure as print fluid is moved through the second set of printheads 108*a*.

Figure 11:
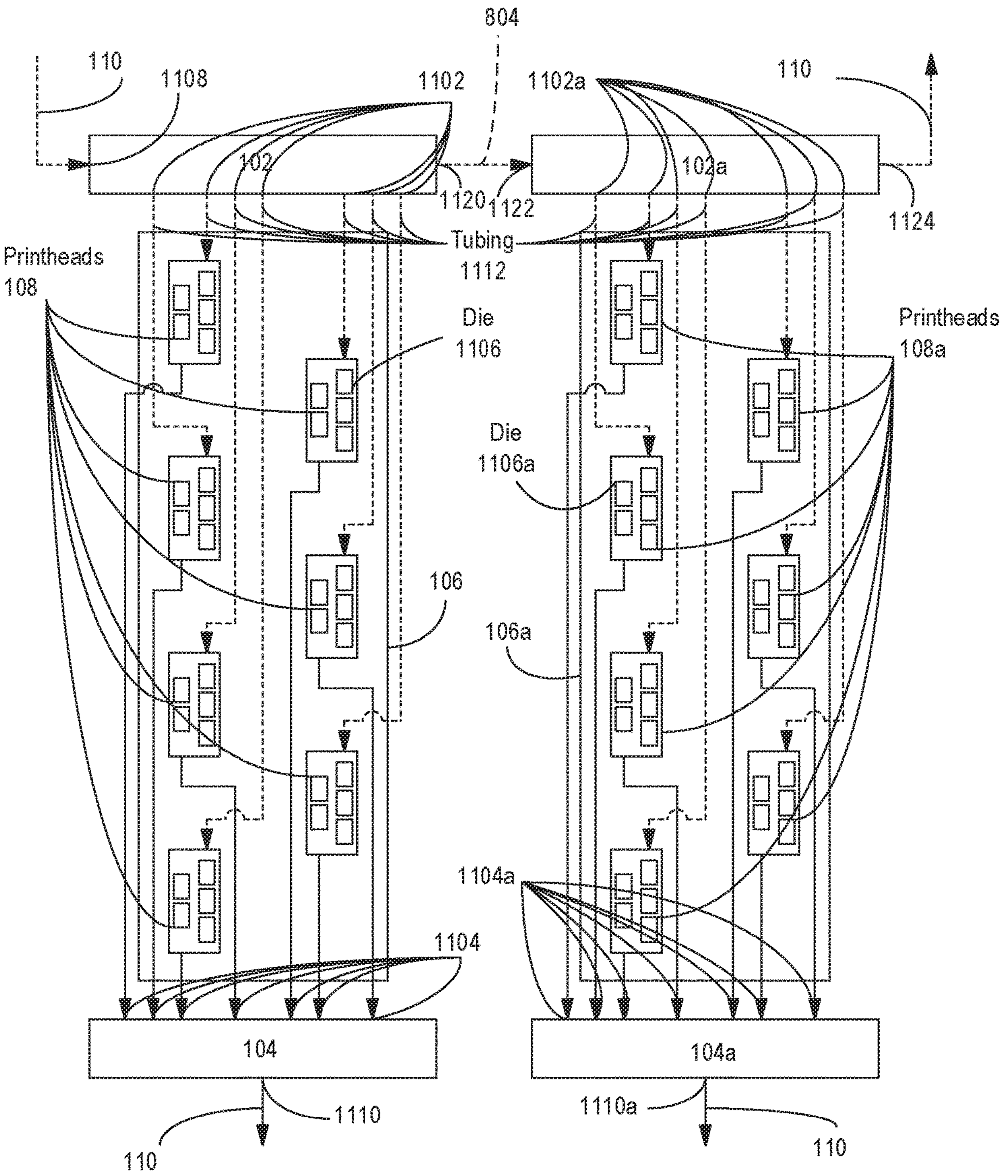
FIG. 11 is a bottom-up view of printbars, supply manifolds, and recirculation manifolds in fluid connection with one another in an example system for print fluid recirculation.

FIG. 11 is a bottom-up view of an example of a first printbar, a first supply manifold, a first recirculation manifold, a second printbar, a second supply manifold, and a second recirculation manifold. FIG. 12A provides a perspective view of the example of a first supply manifold illustrated in in FIG. 11. FIG. 12B provides a perspective view of the example of a second supply manifold illustrated in in FIG. 11, FIG. 12C provides a perspective view of the example of a first recirculation manifold illustrated in FIG. 11. FIG. 12D provides a perspective view of the example of a second recirculation manifold illustrated in FIG. 11.

Looking at FIG. 11 in view of FIGS. 12A and 12C, the first printbar 106 includes a first set of printheads 108 that are in fluid communication with one another, with the first supply manifold 102, and with the first recirculation manifold 104 via tubing 1112. In this example, the first supply manifold 102 includes a chamber 1202 that branches into or connects to several distribution openings 1102 to which print fluid is to be distributed via connected tubing 1112 to the first set of printheads 108. The first supply manifold is to receive print fluid via an intake opening 1108 that is connected to the recirculation pathway 110. In examples, the print fluid may be pushed to the front supply manifold 102 by a supply pump included within the recirculation pathway (e.g., a supply pump such as supply pump 318 of FIG. 6, 7 8, 9, or 10). In examples, the first supply manifold 102 may include valves or interfaces to electronic networks for controlling movement of print fluid through the first supply manifold.

The first printbar 106 holds a first set of printheads 108. In this example, each printhead 108 is to eject print fluid of a same color or other attribute. In this example, the depicted side of the first printbar 106 is for facing a substrate during print fluid ejection operations and holds seven printheads 108, with each printhead housing five printhead die. An example printhead die of the first printbar 106 is assigned reference number 1106. In this example, each printhead die holds a set of printhead nozzles (the printhead nozzles are not visible in FIG. 11) that are for ejecting print fluid upon the substrate. In other examples, the printbar 106 may include any number of printheads, with the printheads including any number of die, and the die including any number of printhead nozzles. In examples, the first supply manifold 102 may include valves or interfaces to electronic networks for controlling movement of print fluid through the first supply manifold.

Continuing at FIG. 11 in view of FIGS. 12A and 12C, the first recirculation manifold 104 includes a chamber 1204 that branches into or connect to several collection openings 1104 through which print fluid is to be received via tubing 1112 from the first set of printheads 108. The first recirculation manifold 104 includes a delivery opening 1110 through which the print fluid is to be moved via connected tubing to the recirculation pathway 110.

Looking at FIG. 11 in view of FIGS. 12B and 12D, the second supply manifold 102*a* is connected to the second printbar 106*a*, and is to receive print fluid via an intake opening 1122 that is connected via tubing of a supply manifolds bridge 804 to the first supply manifold 102. In this example, the second supply manifold 102*a* includes a chamber 1202*a* that branches into or connects to distribution openings 1102*a* to which print fluid is to be distributed via connected tubing 1112 to a second set of printheads 108*a*. The second printbar 106*a* holds the second set of printheads 108*a*. In this example, each printhead 108*a* is to eject print fluid of a same color or other attribute as is to be ejected by the first set of printheads 108. In this example, the depicted side of the second printbar 106*a* is for facing a substrate during print fluid ejection operations and holds seven printheads, with each printhead housing five printhead die, An example printhead die of the second printbar 106*a* is assigned reference number 1106*a*. In this example, each printhead die holds a set of printhead nozzles that are for ejecting print fluid upon the substrate.

Continuing at FIG. 11 in view of FIGS. 12B and 12D, the second recirculation manifold 104*a* includes a chamber 1204*a* that branches into or connect to several collection openings 1104*a* through which print fluid is to be received via tubing 1112 from the second set of printheads 108*a*. The second recirculation manifold 104*a* includes a delivery opening 1110*a* through which the print fluid is to be moved via connected tubing to the recirculation pathway 110. In examples, the second supply manifold 102*a* may include valves or interfaces to electronic networks for controlling movement of print fluid through the second supply manifold.

FIG. 13 is a bottom-up view of another example of a first printbar, a first supply manifold, a first recirculation manifold, a second printbar, a second supply manifold, and a second recirculation manifold. In this example, the first supply manifold 102 and the first recirculation manifold 104 are positioned adjacent to a long side of a rectangular first printbar 106 (rather than adjacent to the ends of a rectangular first printbar 106 as in the example of FIG. 11). In this example, the second supply manifold 102*a* and the second recirculation manifold 104*a* are positioned adjacent to the long side of a rectangular second printbar 106*a* (rather than adjacent to the ends of the rectangular second printbar 106*a* as in the example of FIG. 11). In other respects, the functionality of the first and second printbars 106 106*a*, first and second supply manifolds 102 102*a*, and first and second recirculation manifolds 104 104*a* are substantially similar to those of the example of system 100 depicted in FIG. 11.

FIG. 14 is a flow diagram of implementation of a method for print fluid recirculation. In discussing FIG. 14, reference may be made to the components depicted in FIGS. 1-13. Such reference is made to provide contextual examples and not to limit the way the method depicted by FIG. 14 may be implemented. A controlled application of a negative pressure is made to a recirculation manifold, thereby causing a print fluid to move successively through a supply manifold, a set of printheads, a recirculation manifold, and a recirculation pathway (block 1402). Referring back to FIGS. 4-10, control engine 402 (FIGS. 4 and 6-10) or control module 502 (FIG. 5), when executed by processing resource 540, may be responsible for implementing block 1402.

FIG. 15 is a flow diagram of another implementation of a method for print fluid recirculation. In discussing FIG. 15, reference may be made to the components depicted in FIGS. 1-13. Such reference is made to provide contextual examples and not to limit the way the method depicted by FIG. 15 may be implemented.

As described with respect to FIG. 14, a controlled application of a negative pressure is made to a recirculation manifold, thereby causing a print fluid to move successively through a supply manifold, a set of printheads, a recirculation manifold, and a recirculation pathway (block 1402).

Position of a recirculation isolation valve included within the recirculation pathway is controlled to be in an open or a closed position. When the recirculation valve is in the open position movement of print fluid along the recirculation pathway is not impeded. When the recirculation isolation valve is in the closed position, movement of print fluid along the recirculation pathway is impeded, and movement of print fluid along an ejection operation print fluid return pathway during a print fluid ejection operation is not impeded (block 1504). Referring back to FIGS. 4-10, control engine 402 (FIGS. 4 and 6-10) or control module 502 (FIG. 5), when executed by processing resource 540, may be responsible for implementing block 1504.

FIGS. 1-15 aid in depicting the architecture, functionality, and operation of various examples. In particular, FIGS. 1-13 depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s). Examples can be realized in a memory resource for use by or in connection with a processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is a non-transitory storage media that can contain, store, or maintain programs and data for use by or in connection with the instruction execution system. The term "non-transitory" is used only to clarify that the term media, as used herein, does not encompass a signal. Thus, the memory resource can comprise a physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory (EPROM), flash drives, and portable compact discs.

Although the flow diagram of FIGS. 14 and 15 show specific orders of execution, the order of execution may differ from that which is depicted. For example, the order of execution of two or more blocks or arrows may be scrambled relative to the order shown. Also, two or more blocks shown in succession may be executed concurrently or with partial concurrence. Such variations are within the scope of the present disclosure.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive. The terms "first", "second", "third" and so on in the claims merely distinguish different elements and, unless otherwise stated, are not to be specifically associated with a particular order or particular numbering of elements in the disclosure.

What is claimed is:

1. A print fluid recirculation system, comprising:

a first supply manifold;

a first recirculation manifold;

a first printbar including a plurality of printheads that are in fluid communication with one another, with the first supply manifold, and with the first recirculation manifold;

a second supply manifold, a second recirculation manifold, a second printbar including a second plurality of printheads that are in fluid communication with one another, with the second supply manifold, and with the second recirculation manifold;

a supply manifolds bridge that enables fluid communication of print fluid between the first supply manifold and the second supply manifold; and a recirculation pathway in fluid connection with the first supply manifold, the first recirculation manifold, the second supply manifold, and the second recirculation manifold, the recirculation pathway to enable recirculation of print fluid at a controlled flow through the first plurality of printheads and the second plurality of printheads.

2. The system of claim 1, wherein the recirculation pathway includes a first vacuum source that is in fluid communication with the first recirculation manifold, wherein the first vacuum source is to cause application of a negative pressure to the first recirculation manifold; and a vacuum regulator that is in fluid communication with the first recirculation manifold, the first vacuum source, and a second vacuum source, wherein the vacuum regulator together with the second vacuum source are for adjusting the negative pressure applied to the first recirculation manifold by the first vacuum source.

3. The system of claim 2,
further comprising a reservoir; and
wherein the first vacuum source is a recirculation pump and is to pump print fluid that has passed through the first recirculation manifold and the vacuum regulator into the reservoir.

4. The system of claim 2, further comprising an electronic pressure regulator component in fluid communication with, and situated between, the vacuum regulator and the second vacuum source, the electronic pressure regulator component to cause provision of a pilot pressure to the vacuum regulator.

5. The system of claim 2, further comprising a control engine to control the first vacuum source and the vacuum regulator to provide a target vacuum pressure as print fluid is moved through the first plurality of printheads.

6. The system of claim 2,
wherein the recirculation pathway includes a recirculation isolation valve and a reservoir in fluid communication with the first recirculation manifold; and
wherein the recirculation isolation valve is to enable print fluid to move from the first recirculation manifold to the reservoir when the recirculation isolation valve is open, and is to not enable print fluid to move from the first recirculation manifold to the reservoir when the recirculation isolation valve is closed.

7. The system of claim 6, wherein when the recirculation isolation valve is closed movement of the print fluid along an ejection operation print fluid return pathway during a print fluid ejection operation is not impeded.

8. The system of claim 7, wherein the recirculation pathway includes a shared pathway portion that includes common or same tubing as that is included in the ejection operation print fluid return pathway.

9. The system of claim 2,
wherein the recirculation pathway includes a reservoir and a supply pump in fluid connection with the reservoir;
wherein the first vacuum source is a recirculation pump, the recirculation pump to pump print fluid that has passed through the first recirculation manifold into the reservoir; and
wherein the supply pump is to pump print fluid from the reservoir to the supply manifold.

10. The system of claim 1,
wherein the recirculation pathway includes a recirculation pump, a vacuum regulator, and a vacuum source for to causing application of a negative pressure to the first recirculation manifold for moving print fluid through the first plurality of printheads and the first recirculation manifold in succession, and for causing application of a negative pressure to the second recirculation manifold for moving print fluid through the second plurality of printheads and the second recirculation manifold in succession.

11. A print fluid recirculation method, comprising:
controlling application of a target negative pressure to a first recirculation manifold and a second recirculation manifold, thereby causing print fluid to move successively through a first supply manifold, a first printbar including a first plurality of printheads that are in fluid communication with one another, the first recirculation manifold, a recirculation pathway, a second supply manifold, a second recirculation manifold, a second printbar including a second plurality of printheads that are in fluid communication with one another, with the second supply manifold, and with the second recirculation manifold, wherein a supply manifolds bridge enables fluid communication of print fluid between the first supply manifold and the second supply manifold, wherein the recirculation pathway is in fluid connection with the first supply manifold, the second supply manifold, the first recirculation manifold, and the second recirculation manifold, and wherein the recirculation pathway enables recirculation of print fluid at a controlled flow through the first plurality of printheads and the second plurality of printheads.

12. The method of claim 11, further comprising controlling position of a recirculation isolation valve included within the recirculation pathway to open and closed positions,
wherein when the recirculation valve is in the open position movement of print fluid along the recirculation pathway is not impeded; and
wherein when the recirculation isolation valve is in the closed position, movement of print fluid along the recirculation pathway is impeded, and movement of print fluid along an ejection operation print fluid return pathway during a print fluid ejection operation is not impeded.

13. A print fluid recirculation system, comprising:
a first supply manifold;
a first recirculation manifold;
a first plurality of printheads in fluid communication with one another, with the first supply manifold, and with the first recirculation manifold;
a second supply manifold;
a second recirculation manifold;
a second plurality of printheads in fluid communication with one another, with the second supply manifold, and with the second recirculation manifold;
a supply manifolds bridge that fluidly connects the first and the second supply manifolds;
a recirculation pathway in fluid connection with the first and second supply manifolds and to the first and second recirculation manifolds, the recirculation pathway including a reservoir and at least one vacuum source; and
a control engine to direct the at least one vacuum source to control application of a negative pressure to the first recirculation manifold and the second recirculation manifold, and thereby enable recirculation of print fluid at a controlled flow through the first and second pluralities of printheads.

14. The system of claim 13,
wherein the recirculation pathway includes a first recirculation isolation valve in fluid communication with the first recirculation manifold and a second recirculation isolation valve in fluid communication with the second recirculation manifold;
wherein the first recirculation isolation valve is to enable print fluid to move from the first recirculation manifold to the reservoir when the recirculation isolation valve is open, and is to not enable print fluid to move from the first recirculation manifold to the reservoir when the recirculation isolation valve is closed; and
wherein the second recirculation isolation valve is to enable print fluid to move from the second recirculation manifold to the reservoir when the recirculation isolation valve is open, and is to not enable print fluid to move from the second recirculation manifold to the reservoir when the recirculation isolation valve is closed.

* * * * *